Patented July 21, 1936

2,047,968

UNITED STATES PATENT OFFICE 2,047,968

THERMOPLASTIC COMPOSITIONS AND METHOD OF PREPARING THE SAME

Henry Jacobsen, now by judicial decree to Henry Jenett, Englewood, N. J., assignor to Celanese Corporation of America, a corporation of Delaware No Drawing. Application March 29, 1933, Serial No. 663,344

2 Claims. (Cl. 106—40)

This invention relates to the preparation of compositions comprising thermoplastic compounds in intimate association with modifying agents.

This application is a continuation in part of my copending application Serial No. 641,233 filed November 4, 1932.

An object of my invention is to form compositions of matter that may be shaped under heat and pressure to any desired form, which compositions of matter comprise an organic thermoplastic compound in intimate admixture with any suitable modifying agent. A further object of my invention is to form such compositions of matter by simultaneously grinding and dispersing the thermoplastic compound and the modifying agent in a liquid medium that is a non-solvent or precipitant for the thermoplastic compound. Other objects of my invention will appear from the following detailed description.

In the formation of films, coatings or articles from cellulose derivatives or other thermoplastic compounds, the usual practice is to dissolve such compounds in a volatile solvent to form a solution or plastic mass, which is worked up into desired form, after which the solvent is evaporated. The use of volatile solvents is open to many objections, some of which are the cost, toxicity and fire hazard of the volatile solvents, the commercial impossibility of removing all of the retained solvent and the incompatibility of certain resins, oils and other materials with the cellulose derivatives in such solutions.

I have found that if cellulose derivatives or other thermoplastic organic compounds are simultaneously ground and dispersed in the presence of a liquid medium that has no solvent action on the same, these compounds are in such a form that they are capable of forming homogeneous mixtures or associations with modifying agents, such as plasticizers, resins, oils, pigments, dyes, filling materials and the like, which have superior properties to those of compositions made by any of the prior methods.

While the modifying agents are preferably ground and dispersed in the liquid non-solvent medium simultaneously with the cellulose derivative or other thermoplastic compound, in some cases the modifying agent may be added after such cellulose derivative or other thermoplastic compound has been ground and dispersed in the non-solvent liquid.

In order to obtain the required grinding and dispersing, it is important to employ apparatus suitable for this purpose. This may be accomplished by forcing a suspension of the cellulose derivative or other thermoplastic compound in water or other non-solvent liquid medium between two closely spaced abrasive surfaces, such surfaces being either moved rapidly in opposite directions or one surface moving rapidly while the other is stationary, thus producing a great attrition effect.

A convenient apparatus for causing this grinding and dispersing is a colloid mill having two discs that have opposing abrasive surfaces. These discs may be rotated in opposite direction at relatively high speeds, or one disc may be maintained stationary while the other may be caused to rotate rapidly. At least the surfaces of such disc should be made of abrasive or hard, rough material, such as carborundum, sintered corundum, fritted glass, emery, or roughened steel or other hard metal. These discs may be made wholly of such abrasive material, or their opposing surfaces may be merely coated or lined with the same. A suitable apparatus that may be used is a colloid mill comprising a stationary disc of carborundum through the center of which the suspension to be ground and dispersed is fed into the very narrow space between such stationary carborundum disc and a carborundum disc rotating at say 2500 to 5000 R. P. M.

The use of discs of such abrasive surfaces in the colloid mill is of great importance, since if the ordinary discs of smooth, fluted or grooved metallic surfaces are employed, it is not possible to attain the results obtained by this invention because of lack of proper grinding action.

Any suitable organic thermoplastic compound may be employed in this invention. For instance I may employ derivatives of cellulose such as cellulose nitrate or organic derivatives of cellulose. The organic derivatives may be organic esters of cellulose such as cellulose acetate, cellulose formate, cellulose proprionate or cellulose butyrate, or cellulose ethers such as ethyl cellulose, methyl cellulose and benzyl cellulose. These cellulose derivatives may, prior to treatment, be in the form of flocks, grains, flakes, fibres, granules and the like.

However thermoplastic compounds other than derivatives of cellulose may be employed in my process. For instance halogenated rubber, such as chlorinated rubber, may be ground and dispersed with a plasticizer, such as tricresyl phosphate, in water or other non-solvent liquid and the resulting slurry or paste may be applied to iron or steel pipes or to fabrics to coat the same upon application of heat and pressure. Another example is the case of the working up of polymerized vinyl resins, such as polymerized vinyl acetate or styrol, which do not form satisfactory coatings from their solutions in solvents, because of their high retentivity for solvents. By dispersing such vinyl resins, with or without a plasticizer such as dibutyl phthalate or dibutyl phosphate, in water or other non-solvent liquid, there is formed a paste or slurry which may be used to form coatings on metallic or other surfaces that firmly adhere thereto after the evaporation of the non-solvent liquid and the application of heat and pressure.

Any desired modifying agent for the thermoplastic compound may be incorporated therewith. By "modifying agent" I mean any substance which is adapted to impart any desired properties such as softness, elasticity, flexibility, hardness, gloss, color, stability, etc. to the finished product. Such modifying agents may be plasticizers, dyes, pigments, lakes, filling materials, resins, oils, etc., and the term "modifying agent" as used hereinafter in the claims is to be construed as meaning such substances. Examples of plasticizers are camphor, dibutyl phthalate, diethyl phthalate, tricresyl phosphate, triphenyl phosphate, ethyl paratoluene sulfonamid, etc., the choice of plasticizer depending upon the properties of the thermoplastic compound employed as the base.

The amount of non-solvent liquid employed during the grinding and dispersing will vary in accordance with the nature of the ingredients and the purpose for which the product is intended, so that the product has a consistency varying from a stiff paste to a freely flowing slurry. In the case of the use of water as the non-solvent liquid, the amount employed may be from less than 5 to 12 or more volumes of water per volume of the solid ingredients employed.

A surprising result is obtained when this invention is used in connection with resins, such as shellac, or oils such as linseed oil, which heretofore have been considered incompatible with cellulose acetate or other organic derivatives of cellulose. Prior to my invention, it was not possible to form clear and homogeneous mixtures of cellulose acetate and such oils and resins, since, when attempts were made to form products containing such mixtures from solutions of the same even in optimum solvents, upon evaporation of the solvent the resulting product was cloudy and unhomogeneous.

By the process of this invention, however, it is possible to form a mixture containing cellulose acetate or other thermoplastic compounds and shellac or linseed oil or other so-called incompatible substances, which mixture is capable of forming by the action of heat and pressure or even by the use of solvents, products that are clear and homogeneous. Thus for instance, compositions containing equal parts of cellulose and shellac or compositions containing 70 parts by weight of cellulose acetate and 30 parts by weight of linseed oil, when formed by the process of this invention, can be dissolved in acetone, or other good volatile solvents for cellulose acetate to produce solutions, which, upon evaporation of the volatile solvent, form clear and homogeneous sheets, films, coatings or other articles or products. Such compositions, when freed of the water or other non-solvent liquid medium, may be subjected to heat and pressure without the use of solvents to form clear and homogeneous products.

The process and product of the present invention presents many distinct advantages over prior practice. The compositions formed by my invention have better adhesion to metal or other smooth surfaces than those previously made. The simultaneous grinding and dispersing action of the closely spaced abrasive surfaces having a high rate of relative motion, causes finer distribution of special effect materials such as dyes, pigments and lakes so that a very small amount of coloring matter is necessary to impart the desired color to the product. Products of increased strength may be made by this invention. Moreover when the product of this invention is used as a coating composition, its viscosity can be controlled merely by the thickness of the paste or slurry employed independently of the viscosity characteristics of the cellulose derivative or other thermoplastic compound when dissolved in a volatile solvent.

Since pigments are usually ground in water, a watery paste of such pigments may be used directly in the process of this invention without the necessity of prior drying of the pigment and the resultant aggregation of the particles thereof, as is required in the prior practice. Since this process may be carried out continuously by continuously feeding the ingredients to a colloid mill provided with discs of abrasive surfaces, the products formed are of uniform properties and characteristics as opposed to products made by prior processes involving the use of batch methods.

When the cellulose derivative and modifying agent have been ground and dispersed with water or other non-solvent liquid medium in accordance with this invention, the dispersing and grinding action causes not only disintegration of the components, but it also homogenizes them so that they form a perfect plastic compound, while the dispersing medium, being a non-solvent or a precipitant of the thermoplastic compound, prevents the minute particles of the thermoplastic compound thus formed from coalescing or combining into a coherent, more or less tacky or sleazy mass, which would normally result from the presence of water in a composition of the nature above described.

After the dispersing and grinding action, the solids are present in the form of a perfectly homogeneous plastic compound in extremely finely divided form. When diluted with the same medium in which they were originally dispersed, these particles will not remain in suspension very long, but they will settle out as a composition, each individual particle containing in proportion the same quantity of the components originally passed through the colloid mill, and although no protective colloid or similar aid be employed, the components will not separate out, even when permitted to remain standing for an indefinite period and in extreme dilution.

When even minute quantities of oil-soluble dyestuffs are employed, they may be distributed evenly over a very large volume of cellulose derivative or other thermoplastic composition, so that a uniformly tinted film may be produced from such compositions by either compressing the same between hot surfaces or by casting it from a solution of the same in volatile solvents, which are not otherwise solvents for oil-soluble dyestuffs.

After the paste or slurry is formed by the combined dispersing and grinding action, this may be worked up into the desired product by several methods, examples of which will now be given.

In one mode of procedure, the slurry or paste containing the thermoplastic compound, modifying agents and water or other non-solvent liquid medium is applied directly to the article or surface, which is to be impregnated or covered with the thermoplastic compound. Thus for instance paper or fibre board may be covered with a layer of the plastic composition in slurry or paste form, the liquid dispersing medium, such as water, may be evaporated while the paper or fibre base passes through the drying machine in a paper mill, after which by the use of hot calenders or stacks the thermoplastic composition is fused, thus forming a water- or grease-proof coating, or imparting to the paper or board any other desired properties or finishes, according to the substances employed in making such slurry or paste.

While the use of such slurry or paste is of importance in connection with paper making, since it renders possible the conversion or coating of the paper as a part of the routine paper-making process, as against a distinct and separate operation heretofore applied to the finished paper, it is to be understood that such slurry or paste may be used for the production or coating of other materials such as artificial leather, floor covering or any other type of coated fabric, since such production can be simplified by the application of the slurry directly to the fabric base, giving in one operation a coating of any desired thickness, as the absence of volatile solvents permits of the application of even a very heavy layer of the thermoplastic compound, such as would require from 3 to 6 or more coatings by the ordinary method of spreading or spraying solution of the same.

A further important use of such "slurry" is for the treatment of fabrics, yarns or other textile products. Such a slurry, when made in a liquid medium that has a certain affinity for textile fibers and is compatible with water-soluble sizes and which is not affected by the moisture content of the fabric, may be easily applied at the textile mill, either as a permanent sizing or as a finishing coat, thereby eliminating any conversion steps in separate mills.

A second mode of employing the composition formed by the dispersion and grinding of the thermoplastic compound and modifying agent in the non-solvent medium, is particularly useful when metallic, glass or other non-porous surfaces are to be covered with a thermoplastic composition. Where, for instance, steel or other metal sheets or objects are to be covered or where, for instance, asbestos board is to be enameled to imitate glazed tile, or where leather is to be given a lacquered or so-called patent leather finish, or in other similar cases where the least traces of moisture would be objectionable, the dispersing medium of the slurry is first removed by any suitable method, such as spray-drying or drying in a vacuum. The fine powder resulting from the evaporation of the water or non-solvent medium is applied to the smooth surface of the metal, asbestos board, leather and the like and welded thereto by means of heat and pressure.

In the case where solid bodies are to be formed directly from the thermoplastic compositions, either of the two methods above described may be employed, depending upon the product, the type of equipment available and other factors.

Thus, for instance, thin films or tissue-like transparent foil may be produced from a slurry on equipment and by means similar to those employed in the paper making industry, while bulky pieces such as molded insulation, novelties, etc. should preferably be made from the plastic composition in dry form, in order to save the time required to evaporate the dispersing medium from each individual article before curing or fusing the plastic composition. The product formed after removal of the water or other non-solvent liquid may be used as molding powder in any suitable manner such as by heating the same until it is flowable and extruding into a mold, or by placing the powder in a mold and then applying heat and pressure.

A third method of converting the thermoplastic composition from the "slurry" stage to a finished article of commerce is particularly adapted to the production of film, thin transparent wrapping foil or surface coatings, where time and space are factors and where the evaporation of a dispersing medium from the slurry would involve long runs or such elevated temperatures as may affect the texture, color other properties of the product. In such cases the thermoplastic compound may be dispersed and ground between the abrasive surfaces of a colloid mill or the like together with all the other ingredients entering into the composition, with the exception of the plasticizers which are omitted temporarily, thus forming a "slurry".

Thereupon the plasticizers are diluted with another medium which must be a non-solvent for the plastic base but which is miscible with the dispersing medium of the "slurry". The diluted plasticizer is added gradually and under vigorous stirring to the slurry, whereupon gelatinization or coagulation takes place, the solids in the slurry combining with the plasticizer in the other liquid medium, forming a gel, from which the mixture of the two liquid media separates out very readily. The resulting product may be worked up in any suitable manner, such as by squeezing the remaining moisture therefrom by rollers, after which the dough-like plastic composition may be rolled down to the required thickness and calendered to a high degree of transparency and gloss by means of heated rollers.

In order further to illustrate my invention, but without being limited thereto, the following specific examples are given merely by way of illustration and are in no way limitative.

*Example I*

The following is an example of a method of making a composition to be used for application to a fabric to form artificial leather.

| | Parts by weight |
|---|---|
| Cellulose acetate | 10 |
| Triphenyl phosphate | 3 |
| Ethyl paratoluene sulfonamid | 1 |
| Dimethyl phthalate | 2 |
| Linseed oil | 4 | are suspended in 40 to 60 parts by weight of water. The suspension is fed to a colloid mill, where it is forced between two closely spaced carborundum discs, one of which is stationary and the other is rotating at a speed of about 3,600 R. P. M.

*Example II*

The following is an example of a method of making a molding powder by this invention.

| | Parts by weight |
|---|---|
| Cellulose acetate | 10 |
| Triphenyl phosphate | 3 |
| Ethyl paratoluene sulfonamid | 1 |
| Diethyl phthalate | 2 |
| Chrome yellow | 10 | are suspended in 45 parts by weight of water. This mixture is subjected to the dispersing and grinding action described in Example I. The resulting mass is then freed of water by evaporation in any suitable manner and the dry powder formed may be subjected to heat and pressure in any desired molding operation to form the desired articles.

Example III

The following is an example of a formula for use in making a molding powder containing cellulose nitrate.

| | Parts by weight |
|---|---|
| Cellulose nitrate | 6 |
| Camphor | 2 |
| Tricresyl phosphate | 2 |
| Magnesium carbonate | 1 |
| Zinc oxide | 5 |
| Water | 35 to 45 |

Example IV

The following ingredients may be used for making a coating composition to be applied to paper.

| | Parts by weight |
|---|---|
| Polymerized vinyl acetate resin | 10 |
| Dibutyl phosphate | 2 |
| Water | 25 to 35 |

Toluidine red (Color Index No. 69) in amounts sufficient to impart the required tint.

Example V

The following is an example of a formula of ingredients to be used for flexible coatings on paper, fabric or metallic pipes.

| | Parts by weight |
|---|---|
| Chlorinated rubber | 10 |
| Tricresyl phosphate | 1 |
| Water | 20 |

Nigrosine (enough to impart desired color)

Example VI

The following is a formula or composition to be used for making metallic foils or films.

| | Parts by weight |
|---|---|
| Ethyl cellulose | 10 |
| Mineral oil | 0.5 |
| Urea (crystallized) | 0.5 |
| Gold bronze powder | 5 |
| Water | 30 |

Example VII

This is an example of a process wherein the plasticizer is added as a separate operation from the dispersing and grinding of the thermoplastic compound.

100 parts of cellulose acetate are suspended in about 50 gallons of water and the mixture passed through the dispersing and grinding apparatus described in connection with Example I. Then 25 lbs. of diethyl phthalate, 20 lbs. of para toluene sulfonamid, 10 lbs. of plastol and 10 lbs. of triphenyl phosphate are mixed with 2 to 3 gallons of ethyl alcohol. This mixture of plasticizers and alcohol is then added to the dispersion of cellulose acetate in water gradually and under vigorous stirring. Thereupon a gel, comprising the cellulose acetate and plasticizer, results. The liquid retained in the gel is removed therefrom by squeezing between rollers, after which the dough-like plastic composition is rolled down to the desired thickness and, after the last traces of moisture have been removed, it is calendered between heated rollers to produce sheets, films or foils of a high degree of transparency and gloss.

It is to be understood that the foregoing detailed description is given merely by way of illustration and that many variations may be made therein without departing from the spirit of my invention.

Having described my invention, what I claim and desire to secure by Letters Patent is:

1. Process for compounding thermoplastic compositions, which comprises forming a dispersion by passing between relatively moving abrasive discs a mixture of a thermoplastic organic derivative of cellulose and a substance selected from the group consisting of oils and resins normally incompatible with the derivative of cellulose in a liquid medium which is a non-solvent for said materials, adding to the dispersion a homogeneous composition containing a plasticizer, said composition being insoluble in said liquid medium and containing an amount of plasticizer sufficient to cause gelatinization of the organic derivative of cellulose.

2. Process for compounding thermoplastic compositions, which comprises forming a dispersion by passing between relatively moving abrasive discs a mixture of cellulose acetate and a substance selected from the group consisting of oils and resins normally incompatible with the cellulose acetate in a liquid medium which is a non-solvent for said materials, adding to the dispersion a homogeneous composition containing a plasticizer, said composition being insoluble in said liquid medium and containing an amount of plasticizer sufficient to cause gelatinization of the cellulose acetate.

HENRY JACOBSEN.